United States Patent Office 3,507,398
Patented Apr. 21, 1970

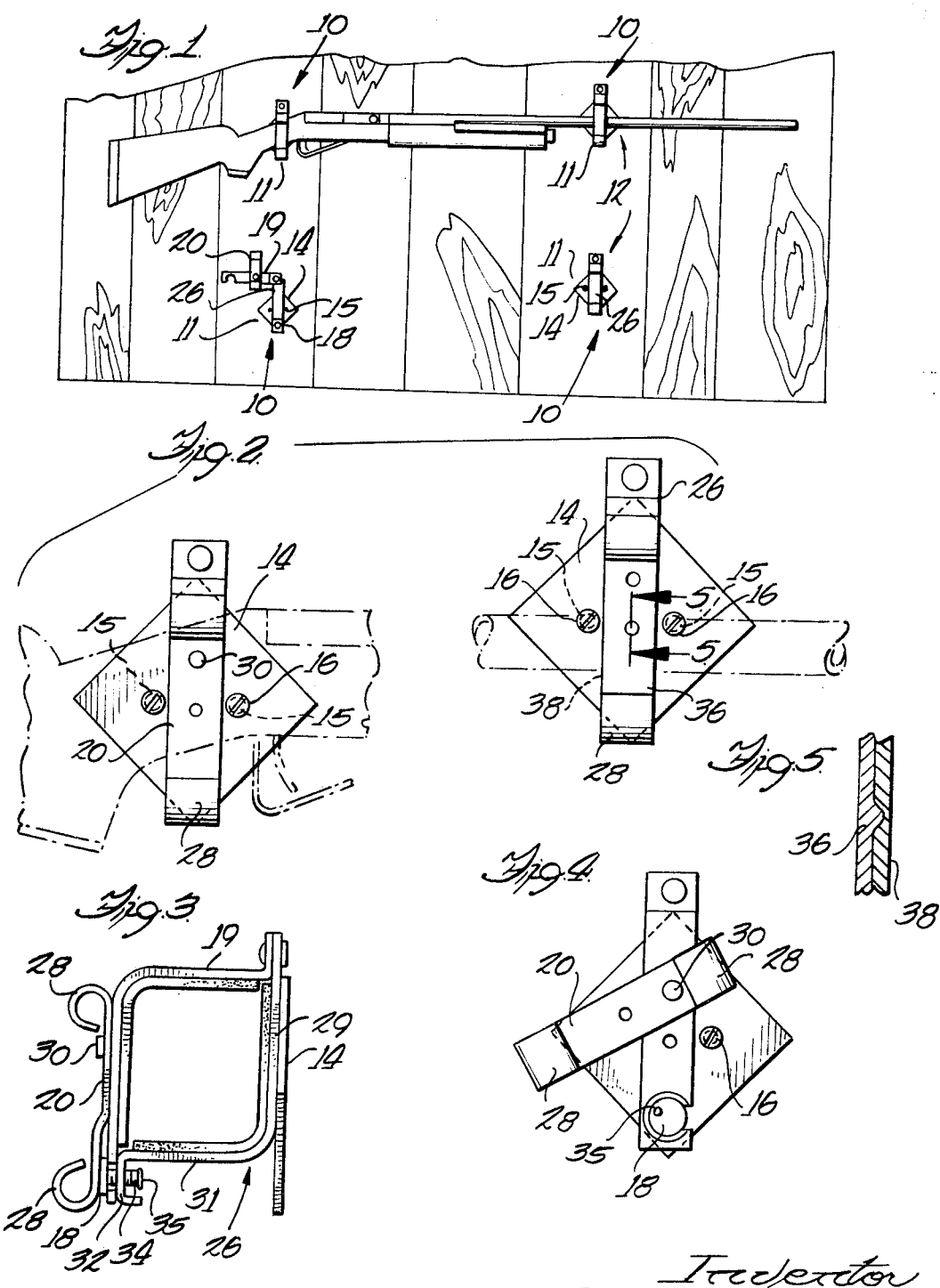

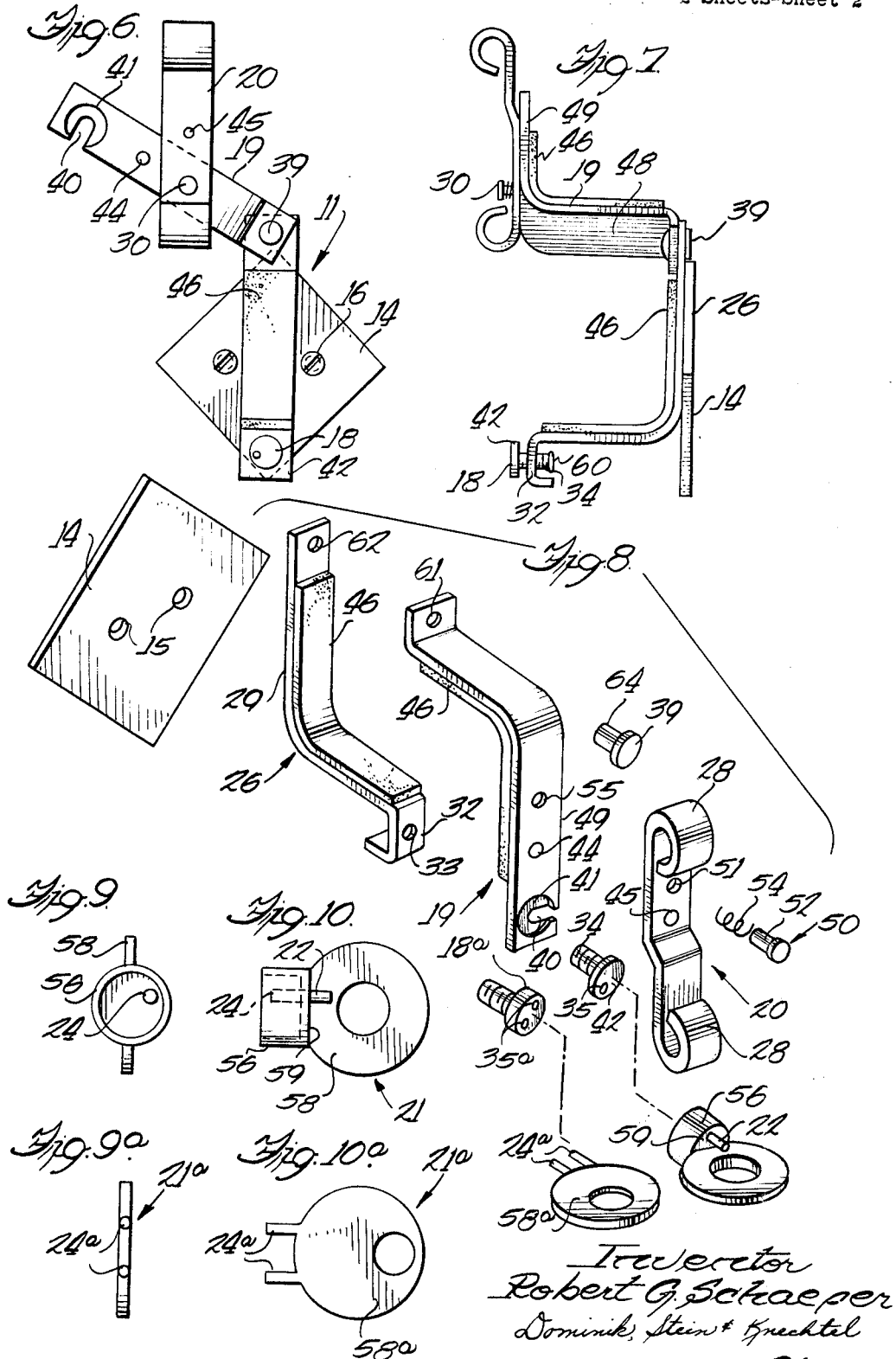

1

3,507,398
GUN MOUNT SET
Robert G. Schaefer, Highland Park, Ill., assignor to Central Specialties Company, Chicago, Ill., a corporation of Illinois
Filed Nov. 9, 1967, Ser. No. 681,811
Int. Cl. E05b *73/00;* A47f *7/00*
U.S. Cl. 211—4    6 Claims

ABSTRACT OF THE DISCLOSURE

The disclosure shows a gun mount which comprises two elements having a closed loop section. One element is a muzzle mount which is secured to a flat surface such as a wall, and the other element is a stock mount which is also secured to a flat surface such as a wall. The stock mount differs from the muzzle mount primarily in that the closed loop can be interrupted by swiveling one L-shaped member against another to insert the stock while the muzzle is thrust through the closed loop of the muzzle mount, the stock mount being closed and secured by a safety locking screw after the gun is inserted, and a cover plate pivotally swung over the safety screw to hide the same from unauthorized persons.

---

The present invention relates to a Gun Mount Set, and more particularly to such a mount which comprises a stock mount and a muzzle mount which are independently secured to a surface, usually a room wall, the stock mount of which contains a safety lock feature.

Gun mounts traditionally have contained a pair of parallel stirrup-like or J-shaped members for cradling the stock of a gun at one end, and the muzzle at the other. The bulk of these mounts are intended for rifles, shotguns, and the like. In some instances such gun locks are provided with through rods or other devices for securing all of the guns in the rack. Floor mounts and glass covered case mounts of a wide variety have also been employed but are quite expensive, and justifiable primarily where several guns are to be mounted.

The prior art has failed to produce, however, a gun mount which is as effective for one gun as several, and which is attractive, but most importantly, safe and secure in preventing children or other unauthorized personnel from removing the gun from the mount.

In view of the foregoing, it is the principal object of the present invention to provide a gun mount which can be securely locked to the gun with the locking mechanism closed for security as well as design purposes.

A related object of the invention is to provide a gun mount of the secured type which is adaptable for mounting a single gun such as a shotgun or rifle, and yet adjustable for varying stock lengths and configurations for mounting on any wall or similar surface.

A related object of the invention looks to the provision of a gun mount which cannot only mount a single rifle or shotgun effectively and with security, but which is adaptable for grouping a cluster of such guns on a wall in either a vertically oriented pattern, diagonally, or a whole host of decorator inspired configurations.

Additionally, another object of the invention relates to the economical construction of the subject gun mount which is susceptible of fabrication with a large number of common pieces, the bulk of which may be formed from stampings and require a minimum of machining.

Further objects and advantages of the present invention will become apparent as the following description of an illustrative embodiment proceeds, taken in conjunction with the accompanying drawings, in which:

2

FIGURE 1 is a front elevation illustrating the gun wall mount in position holding a gun in the upper location, and showing the safety mount muzzle mounting member in the open position therebeneath.

FIGURE 2 is an enlarged partially broken view showing in front elevation the two mounts in enlarged scale from that shown in FIG. 1.

FIGURE 3 is a side view, partially broken, of the stock mount shown in the left hand portion of FIG. 2 and taken from the right hand side thereof.

FIGURE 4 is a front elevation of the stock mount shown at the left hand portion of FIG. 2 illustrating the cover plate in its open position revealing the safety screw.

FIGURE 5 is an enlarged transverse sectional view taken along section line 5—5 of FIG. 2 illustrating how the false cover plate is secured to the false latch member on the muzzle mount.

FIGURE 6 is a sequential view from the configuration shown in FIG. 4, with the cover plate as well as the latch member swung into the open position for receiving the stock portion of the gun.

FIGURE 7 is an end view of the configuration shown in FIG. 6 of the stock mount.

FIGURE 8 is an enlarged exploded perspective view of the stock mount illustrating the relationship between the safety key and the safety screw.

FIGURE 9 is an end view of the safety key, and FIGURE 9(*a*) of an alternative key.

FIGURE 10 is a front elevation of the safety key illustrating how the siting tab correlates with the locking tab, and FIGURE 10(*a*) of an alternative key.

The basic function and operation of the present invention is illustrated in FIG. 1 where it will be seen that the gun wall mount set 10 comprises a pair of matched units, a stock mount 11, and a muzzle mount 12. Each member has a mounting plate 14 which contains desirably a pair of mounting holes 15 into which mounting screws 16 are inserted for securing the same to a wall. A latch member 19 pivotally swings from a support member 26, a cover plate 20 serving to hide the safety screw 18 from view in the normal position as shown with the gun 13 at the upper portion of FIG. 1.

More specificially as shown in FIG. 2 it will be seen that the mounting plate 14 is a square member cut from flat stock having two holes 15 into which the mounting screws 16 are inserted for securing the same to any wall surface. The cover plate 20 (see FIGS. 2 and 3) has a pair of reversely bent ends 28 and a spring-loaded pivot assembly 30 (to be described hereinafter). The support member 26 is shown in a general L-shaped configuration, the rear leg 29 being secured as by riveting or spot welding to the mounting plate 14, and the bottom leg 31 terminating with a reversely bent safety screw support 32. The safety screw 18 is threadedly engaged to the safety screw support 32, and the threaded shank 34 terminates in a mashed end 60 which prevents the removal of the safety screw from its mount.

As will be observed in FIG. 4, the cover plate 20 pivots about its pivot assembly 30 thereby exposing the safety screw 18. The safety screw 18 is released by employing the safety key 21 (see FIGS. 9 and 10) which is proportioned to engage the safety hole 35.

Before turning to more specific details of construction of the stock mount 11, it should be remarked that the muzzle mount 12 as illustrated in the right hand portions of FIGS. 1 and 2 is structurally substantially identical with the stock mount 11 except for the elimination of the safety screw 18 and the spring loaded pivot assembly 30 which are unnecessary since the gun 13 is mounted by inserting its muzzle into the muzzle mount 12, and thereafter securing the same by means of the stock mount 11. FIG. 5 illustrates a transverse sectional view illustrating how a pair of pin marks or spot welds are employed to permanently secure the false cover plate 36 to the false latch 38.

When the stock mount 11 (see FIG. 6) is opened to receive the stock of the gun 13, it will be observed that the latch 19 rotates about the latch pivot pin 39, and the cover plate 20 pivots about the spring loaded pivot assembly 30 revealing the key slot 40 in the lower end of the latch 19 which additionally includes a counter-bore 41 to receive the head 42 of the safety screw 18. A latch detent 44 is exposed on the body of the latch which has a mating cover detent 45 which swivelably and removably secures the cover 20 in place in masking relationship to the safety screw 18. It will be additionally observed that a felt liner 46 is affixed to the rear leg 29 and bottom leg 31 of the support member 26 to prevent scratching and scuffing of the stock of the gun 13. The latch 19 is also L-shaped like the support member 26 having an upper leg 48 and outer leg 49, the outer leg 49 being the member to which the spring loaded pivot assembly 30 is secured. The latch 19 also has a felt liner 46 to prevent scuffing.

As will be observed in the exploded view of FIG. 8, the spring loaded assembly comprises a headed pivot pin 50 the shaft of which is riveted into the pivot assembly securing hole 55 in the leg 49 of latch member 19. The smooth shank 52 of the headed pivot pin 50 passes freely through pivot assembly hole 51 in cover plate 20 and is surrounded by the coil spring 54, the same being coated with the exterior finish of the headed pivot pin 50 and therefore being generally obscured from the over-all view of the muzzle mount 11. The latch detent 44 is engaged by the cover detent 45 as described in connection with FIG. 6 when the cover plate 20 is secured in position to hide the safety screw 18.

As was described earlier, the head 42 of the safety screw 18 contains a safety hole 35 which is proportioned to matingly engage the locking pin tab 24 of the safety key 21. As will be observed in FIGS. 9 and 10, the locking tab 24 extends from within the engagement barrel 56 of the safety key 21, and the safety pin opposite side becomes a siting tab 22 which permits the user to know the position of the locking tab when positioning the engagement barrel 56 over the safety screw head 42 to lock the unit. An alternative safety key 21(a) with two locking pin tabs 24(a) to engage two safety holes 35(a) in safety screw 18(a) is shown in FIGS. 9(a) and 10(a) and alternatively in FIG. 8.

An annular finger tab 58 is secured to the circular end 59 of the engagement barrel 56. By rotating the safety key 21, the threaded shank 34 of the safety pin 18 moves the head 42 into position within the counter-bore 41 of the outer leg 49 of the latch 19. As illustrated in FIG. 7 the threaded shank 34 of the safety screw 18 is provided with a mashed head 60 which prevents the user from unscrewing the safety screw 18 from its position in the safety screw support 32 of the support member 26. Thus the safety screw cannot be lost in normal use. The latch pivot pin 39 passes through the latch member pivot hole 61 and the support member pivot pin receiving hole 62 and is secured in place by riveting at the rear portion of the latch pivot pin shank 64. The rear leg 29 of the support member 26 is secured to the mounting plate 14 by riveting, spot welding, or other conventional assembly techniques.

In review, it will be seen that a gun wall mount set 10 has been provided which includes a stock mount 11 and a muzzle mount 12, both of which are matched for appearance's sake, but the stock mount 11 is provided with a safety locking latch 19 which cooperates with a safety screw 18 and matching safety key 21 to secure the gun 13 in position on the wall from removal by any person who is incapable of locating the safety key 21, and employing the same. The configuration of the stock mount and muzzle mount, being generally the same, requires only a single set of tooling for the two parts, the principal difference being the omission in the muzzle mount 12 of the safety screw 18 and pivotal mounting of both the latch 19 and cover plate 20. Instead, a false cover plate 36 hides a false latch (but which serves to secure the muzzle) 38. The support members 26 of both the stock mount 11 and muzzle mount 12 are the same, except for modification for the latch pivot pin 39 and safety screw support threaded hole 33. In practice, an antique bronze or copper finish can be applied to the gun mount, the diamond-shaped configuration of the mounting plate 14 and the reversely bent ends 28 of the cover plate 20 serving a decorative function.

While the invention has been described in connection with specific embodiments and applications, no intention to restrict the invention to the examples shown is contemplated, but to include within the invention all of the subject matter defined by the spirit as well as the letter of the annexed claims.

I claim:
1. A gun mount set comprising, in combination, a stock mount member and a muzzle mount member, the muzzle mount member having a closed loop portion and means for securing the same to a surface, the stock mount member having means for securing the same to a surface and comprising a two part loop latch means, one part mounted to said surface and the other part being movable to allow the stock mount member to be mounted and demounted, safety means including substantially aligned passageways in said two parts, the passageway in said movable part being slotted, a locking member which interlocks the two parts when inserted in said passageways, and a key coordinated to said locking member to engage and partly remove said locking member to allow said movable part to move free of said locking member, and thereby open said stock mount member.

2. In the gun mount set of claim 1, a cover plate swivelably secured to the latch means for covering the locking member.

3. In the gun mount of claim 1, a headed screw having a safety hole serving as a locking member, and a barrel-shaped key with a locking tab, the latter being proportioned to engage the safety hole while the barrel engages the headed portion of the screw.

4. In the gun mount of claim 1, latch means and support means for the interrupted loop characterized by a pair of L-shaped members pivotally secured at one end, and lockably secured at the other end by means of a headed safety screw, key slot, and counter-bore.

5. In the gun mount of claim 4, a cover plate swivelably secured to the L-shaped member having the key slot to pivot into position atop the key slot.

6. In the gun mount of claim 5, a spring loaded pivoted connection for the cover plate, and detent means on the cover plate and L-shaped member matching to position the cover plate on the L-shaped member in full masking relationship with the safety screw.

References Cited

UNITED STATES PATENTS

| 2,158,623 | 5/1939 | Fischbacher | 211—64 X |
| 2,552,293 | 5/1951 | Page et al. | 211—4 X |
| 2,667,274 | 1/1954 | Diebold | 211—64 |
| 2,668,645 | 2/1954 | Pease | 211—64 X |
| 2,946,452 | 7/1960 | Caloiero et al. | 211—4 |
| 3,211,408 | 10/1965 | Schaefer | 211—4 X |
| 3,291,317 | 12/1966 | Bowen | 211—4 |

DAVID H. BROWN, Primary Examiner

U.S. Cl. X.R.

211—64